April 7, 1942.   B. LOEFFLER ET AL   2,278,663
CLUTCH THROW-OUT BEARING
Filed March 29, 1939

INVENTOR.
Bruno Loeffler
and George B. Martin
BY
Hoguet, Neary & Campbell
ATTORNEYS Patented Apr. 7, 1942

2,278,663

UNITED STATES PATENT OFFICE 2,278,663

CLUTCH THROWOUT BEARING

Bruno Loeffler, West New York, and George B. Martin, Plainfield, N. J., assignors to Mack Manufacturing Corporation, Long Island City, N. Y., a corporation of Delaware Application March 29, 1939, Serial No. 264,702

9 Claims. (Cl. 192—110)

The present invention relates to lubricating mechanism for bearings and embodies, more specifically, an improved bearing retainer, for example, for a clutch throw-out bearing, in the structure of which, lubricating mechanism of an improved form has been embodied.

Considerable difficulty has been experienced heretofore in providing adequate lubrication for bearings of the type used in clutch throw-out mechanisms inasmuch as the grease which is supplied to the bearing will quickly escape with the result that the bearing is inadequately lubricated before long and, as a result, failure of the bearing is caused.

In accordance with the present invention, it is proposed to provide a bearing structure of such nature that an adequate supply of lubricant will be carried by the bearing and supplied to it gradually and in such quantities as is required for the proper lubrication thereof.

A further object of the invention is to provide a bearing structure of the above character wherein stagnation or pocketing of the lubricant in the lubricant reservoir is avoided, the structure being of such character that freshly supplied lubricant will force the previously supplied lubricant into a position to be metered to the bearing as occasion requires.

Further objects of the invention will be apparent as it is described in greater detail in connection with the accompanying drawing, wherein.

Figure 1:
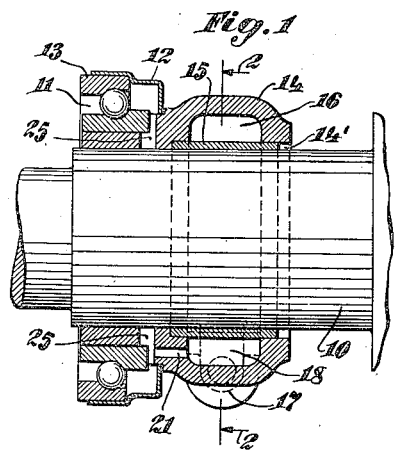
Fig. 1 is a view in transverse section, taken through a bearing constructed in accordance with the present invention and on the line indicated at 1—1 in Fig. 2.
Figure 2:
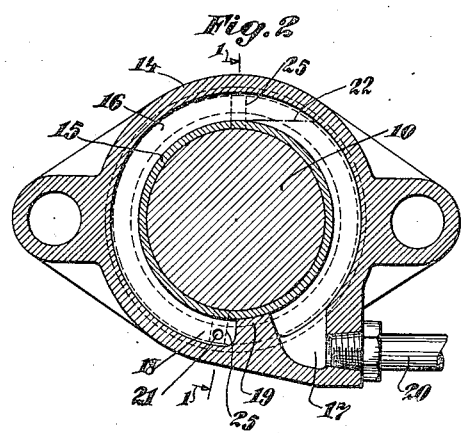
Fig. 2 is a view in section taken on the line 2—2 of Fig. 1 and looking in the direction of the arrows, this view illustrating the shape of the lubricant reservoir, the manner in which fresh lubricant is supplied to the reservoir and the manner in which lubricant is metered from the reservoir to the bearing.

Referring to the above drawing and particularly to Figs. 1 and 2, a shaft 10 is illustrated as carrying a throw-out sleeve 14 which is adapted to slide axially on the shaft to engage release levers not shown in the drawing. A bearing 11 is carried by the sleeve 14 and is provided with a shield 12 carried by the outer race 13. An insert 15 is pressed into the sleeve 14 through an enlarged end 14', after which the sleeve is reamed in any desired fashion. There is thus formed a cavity or reservoir 16 having an inlet end 17 and a discharge or metering end 18. A shoulder 19 is formed in the sleeve 14 in order that communication between the inlet and outlet ends of the reservoir may be prevented.

A fitting 20 communicates with the inlet 17 and an aperture 21 is formed between the outlet or metering end of the reservoir and the bearing 13. The size of the aperture or hole is made such as to permit a desired escape or metering of the lubricant within the reservoir into the bearing. The flow of the grease or lubricant out of the aperture 21 is retarded by the formation of a vacuum at the top of the annular ring. This will prevent the immediate escape of the lubricant and will thus insure a gradual feed of lubricant to the bearing for a considerable time. When the left hand side of the groove, as viewed in Fig. 2, is empty and the lubricant is at the level indicated by the line 22 in Fig. 2, no more lubricant will be fed to the bearing. At this time, fresh lubricant should be introduced through a fitting 20 and this fresh lubricant will push the unused lubricant in the right hand side of the groove into working position, thus avoiding stagnation or pocketing of grease or lubricant in the reservoir.

Figure 3:
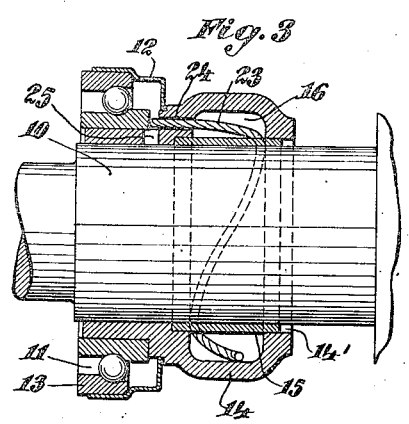
Fig. 3 is a view similar to Fig. 1 showing a modified form of lubricant reservoir.
Figure 4:
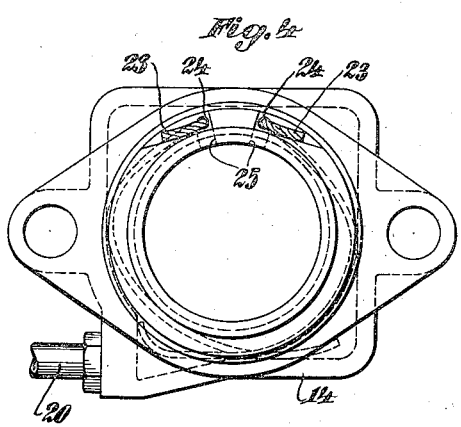
Fig. 4 is a view in front elevation of the structure shown in Fig. 3.

In the form of the device shown in Figs. 3 and 4, provision is made for lubrication of the bearing by oil. In this case, the reservoir is formed in the same manner as described in connection with the construction shown in Figs. 1 and 2, except that the shoulder or dam 19 is omitted and a wick 23 is provided. The ends of the wick extend through apertures 24 and furnish lubricant to the bearing in a manner which will be readily apparent. In each of the forms shown in the drawing, grooves 25 are provided for lubricating the shaft.

It will be seen that the foregoing structure provides for the effective lubrication of the bearing and insures an adequate supply of lubricant over an extended period of time. By means of the structure illustrated, the lubricant is metered gradually, and as needed, to the bearing, and stagnation or pocketing of lubricant in the reservoir is avoided.

While the invention has been described with reference to the accompanying drawing, it is not to be limited save as defined in the appended claims.

We claim:

1. Bearing lubricating means comprising a shaft, a sleeve slidably mounted on the shaft, a bearing carried by the sleeve, means forming a closed annular reservoir within the sleeve, a shoulder disposed adjacent the lower portion of said sleeve forming an obstruction within the said reservoir, means adjacent one side of the shoulder for supplying lubricant to the reservoir, and means adjacent the opposite side of the shoulder forming a small aperture for the passage of lubricant therethrough to the bearing.

2. Bearing lubricating means comprising a shaft, a slidable throw-out sleeve mounted on the shaft, a bearing carried by the sleeve, means in the sleeve forming an elongated reservoir adjacent the bearing, means to admit lubricant to the reservoir, means in the sleeve substantially sealing the upper portion of the reservoir whereby a flow of lubricant from the reservoir causes a vacuum to form in the upper portion of the said reservoir, and outlet means forming a lubricant passageway between the lower portion of the reservoir and the bearing, said passageway being of limited size to limit the amount of lubricant passing therethrough to the bearing.

3. Bearing lubricating means comprising a shaft, a slidable throw-out sleeve mounted on the shaft, a bearing carried by the sleeve, means in the sleeve forming a reservoir adjacent the bearing, inlet means to admit lubricant to a lower portion of the reservoir, means in the sleeve for preventing a flow of lubricant from the upper portion of the reservoir to the bearing and shaft, and outlet means adjacent but separated from the inlet means forming a lubricant passageway between the lower portion of the reservoir and the bearing.

4. Bearing lubricating means comprising a shaft, a slidable throw-out sleeve mounted on the shaft, a bearing carried by the sleeve, means in the sleeve forming a reservoir adjacent the bearing, means in the reservoir dividing the lower portion of the reservoir, means adjacent one side of said dividing means for admitting lubricant to the reservoir, means in the sleeve for preventing a flow of lubricant from the upper portion of the reservoir to the bearing and shaft, and outlet means adjacent the side of said dividing means opposite from said inlet means forming a lubricant passageway between the reservoir and the bearing.

5. Bearing lubricating means comprising a shaft, a slidable throw-out sleeve mounted on the shaft, a bearing carried by the sleeve, means in the sleeve forming a reservoir adjacent the bearing, means to admit lubricant to the reservoir, means comprising an insert in the sleeve for preventing a flow of lubricant from the upper portion of the reservoir to the bearing and shaft, and outlet means forming a lubricant passageway between the lower portion of the reservoir and the bearing.

6. Bearing lubricating means comprising a shaft, a slidable throw-out sleeve mounted on the shaft, a bearing carried by the sleeve, an annular groove in the inner surface of said sleeve, an annular insert substantially covering said annular groove to form a lubricant reservoir therebetween, means for admitting lubricant to said reservoir, and means for conducting lubricant from said reservoir to the bearing.

7. Bearing lubricating means comprising a shaft, a slidable throw-out sleeve mounted on the shaft, a bearing carried by the sleeve, an annular groove in the inner surface of said sleeve, an annular insert substantially covering said annular groove to form a lubricant reservoir therebetween, means for admitting lubricant to said reservoir, means for conducting lubricant from said reservoir to the bearing, and a shield between the sleeve and the bearing enclosing the last named means.

8. Bearing lubricating means comprising a shaft, a slidable throw-out sleeve mounted on the shaft, a bearing carried by the sleeve, a groove in the inner surface of said sleeve, an annular insert substantially covering said groove to form a lubricant reservoir therebetween which is substantially closed at its upper portion to prevent lubricant from passing therefrom to the bearing and shaft, means for admitting lubricant to said reservoir, and means forming a lubricant passageway between the lower portion of said reservoir and the bearing.

9. Bearing lubricating means comprising a shaft, a slidable throw-out sleeve mounted on the shaft, a bearing carried by the sleeve, an annular groove in the inner surface of said sleeve, an annular insert substantially covering said annular groove to form a lubricant reservoir therebetween, said reservoir being substantially closed at its upper portion to prevent lubricant from passing therefrom to the bearing and shaft, means for admitting lubricant to said reservoir, and means forming an aperture of limited size for conducting a limited amount of lubricant from said lower portion of the reservoir to the bearing.

BRUNO LOEFFLER.
GEORGE B. MARTIN.